Aug. 4, 1953  M. H. PELAVIN  2,647,508
ESOPHAGEAL SWITCH FOR ELECTROCARDIOGRAPH APPARATUS
Filed May 6, 1950
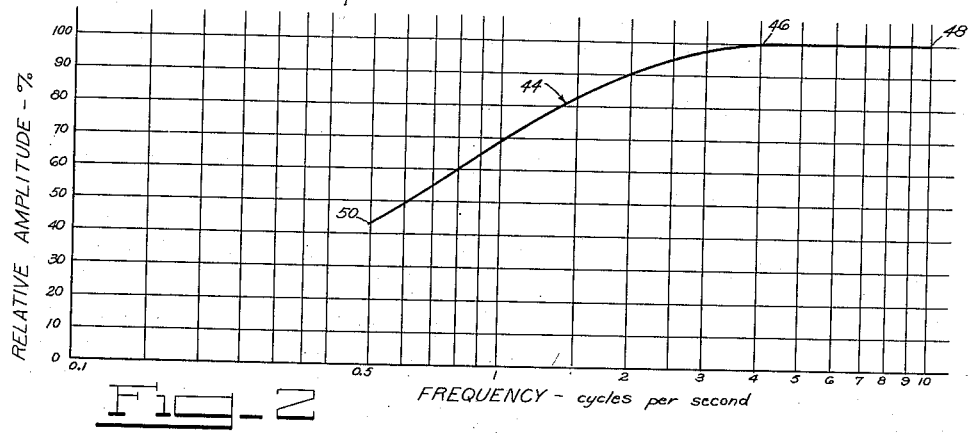
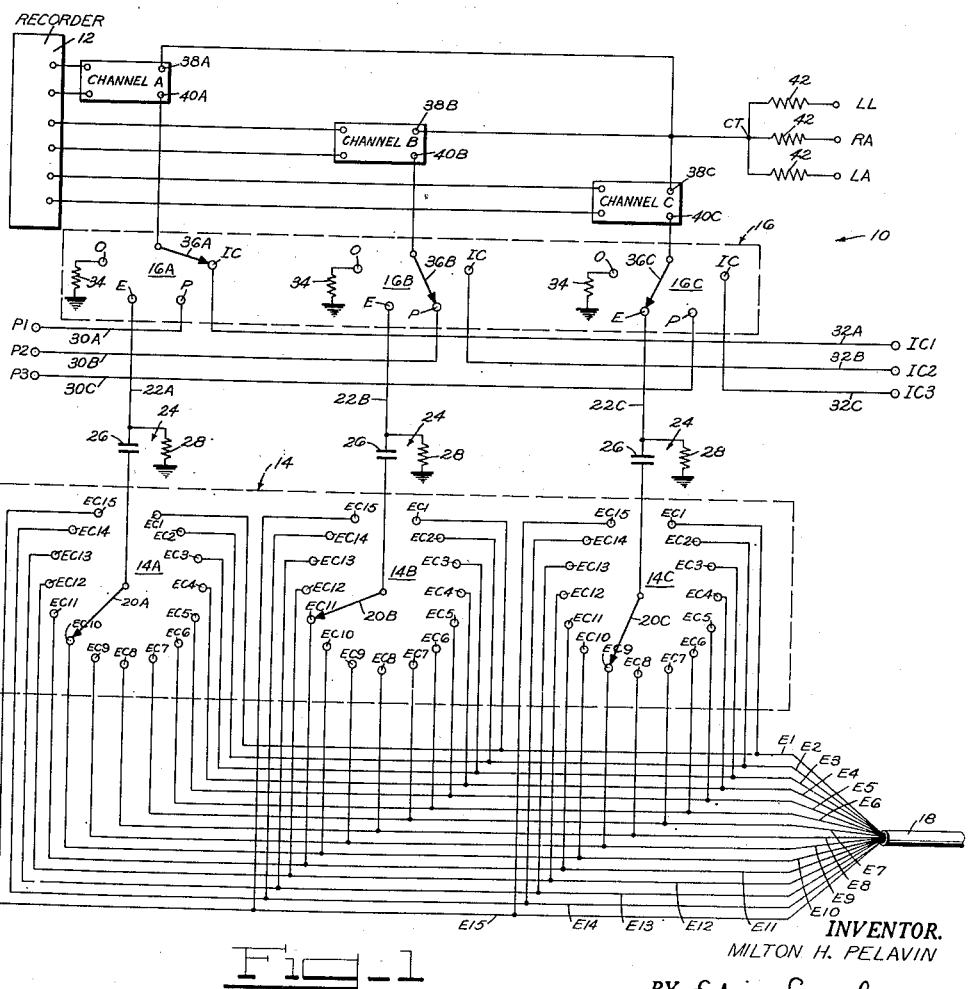
INVENTOR.
MILTON H. PELAVIN
BY Edwin Levison &
Harry Cole
ATTORNEYS Patented Aug. 4, 1953

2,647,508

UNITED STATES PATENT OFFICE 2,647,508

ESOPHAGEAL SWITCH FOR ELECTROCARDIOGRAPH APPARATUS

Milton H. Pelavin, Brooklyn, N. Y., assignor to Technicon Cardiograph Corporation, New York, N. Y., a corporation of New York Application May 6, 1950, Serial No. 160,511

10 Claims. (Cl. 128—2.06)

The present invention relates to multiple-lead electrocardiographs and to electrical and electronic circuits therefor.

In application Ser. No. 762,633, filed July 22, 1947, and assigned to the assignee hereof, there is disclosed and claimed a multiple-lead electrocardiograph operable to produce simultaneously and directly on a record web or sheet a plurality of graphs or traces of body voltage variations transmitted from the subject by the several leads, respectively, and to produce said graphs or traces on the web or record sheet in such manner that they all have an identical time relation with respect to each other. In the apparatus described in said application, provision is made for recording of the standard (interextremity) potentials, designated in cardiology as leads I, II, and III, for recording unipolar chest voltages, designated in cardiology as the chest or precordial leads, and for recording the augmented unipolar extremity leads, designated in cardiology as the $a$VR, $a$VL and $a$VF leads. A lead selector switch is provided in said apparatus for connecting the different sets of leads to the companion channels, respectively, each of which includes electronic amplifying means for amplifying the body voltages transmitted to said channels in accordance with the setting of the selector switch. The unipolar precordial or chest leads record the potentials from the anterior surface of the heart. In order to obtain unipolar leads, whether from the chest or from the extremities, a special connection, known in cardiology as an indifferent electrode of zero potential, for example, the Wilson terminal, or the Goldberger terminal, is used in conjunction with a precordial electrode or with a unipolar extremity electrode, as the case may be, said latter electrodes being designated as the exploring electrode. In "A primer of electrocardiography" by Burch and Winsor, published by Lea & Febiger, 1949, it is pointed out, on page 132, that frequently because of the position of the heart or, as a result of the disease thereof, it is necessary to employ positions on the body for the exploring precordial electrode which are more to the right or left or above or below the usual six sites of the multiple precordial leads. If it is desired to determine the electric activity of the heart auricles or of the posterior wall of the heart ventricle, the exploring electrode is placed in the esophagus at the level at which the left auricle or ventricle rests against this organ, the indifferent electrode being placed, as described therein. When so used to obtain indications of the electric activity of the heart, these electrodes constitute the esophageal lead. As indicated on page 132 of said volume, the esophageal lead is used when it is impossible to identify P waves in the standard leads and it is especially desirable in the study of auricular depolarization. The P waves in the esophageal leads are usually peaked and of great amplitude. The esophageal lead is also used to identify and study posterior myocardial infarction. However, it has been found that the esophageal leads, in addition to transmitting desired voltages representative of the condition of the heart, also transmit undesired incidental body voltages, such as, for example, the very low frequency breathing or respiratory voltages, in addition to gastric voltages, all of which are amplified and recorded in the electrocardiograph. Said incidental voltages are often relatively large and tend to obscure the desired electrocardiograph recordings representative of the condition of the heart, known in cardiology as the ECG complexes, and make it difficult to obtain consistent readings thereof.

In accordance with the present invention and pursuant to the primary object thereof, provision is made for substantially attenuating or suppressing incidental low frequency body voltages transmitted by the esophageal lead before they enter the amplifying channels of the electrocardiograph, while permitting the higher frequency voltages representative of the condition of the heart to enter the amplifying channels with no appreciable attenuation.

A further object is the provision of a selector switch for recording three simultaneous esophageal leads or any desired combination of an esophageal lead, a chest or precordial lead, and an intra-cardiac lead.

The above and other objects, features and advantages of the present invention will be more fully understood from the following description considered in connection with the accompanying illustrative drawings.

In the drawings:

Fig. 1 is a schematic illustration of a multiple-lead electrocardiograph embodying the present invention; and Fig. 2 is a curve illustrating the low frequency response characteristic of the apparatus of the present invention.

Referring now to the drawings, as shown in Fig. 1, the multiple-lead electrocardiograph apparatus 10 is provided with three separate channels A, B and C, respectively. Each of said channels includes electronic amplifying means for amplifying the body voltages transmitted to said channels by leads from different parts of the subject's body. The electrical circuits of these channels are all alike, and may be of the type illustrated and described in the above identified application. If desired, each channel may be provided with a step-controlled sensitivity device, such as is described and claimed in application Ser. No. 14,558 filed March 12, 1948, and assigned to the assignee hereof, whereby the sensitivity of all the channels may be altered, not only simultaneously but substantially instantaneously from one sensitivity to another, without loss of record of intermediate heart beats and without re-adjustment of any of the controls of the amplifier. The output of each of said channels is fed to an indicator or recorder 12 which is preferably of the general type disclosed in the first above identified application and which generally includes a stylus or pen which records the body voltage variations on a web of paper.

In addition to the selector switch, illustrated and described in the first above mentioned application, for recording the standard leads I, II and III, the unipolar precordial leads, and the augmented unipolar extremity leads, the electrocardiograph 10, pursuant to the present invention, is provided with the combination of esophageal switch 14 and lead selector switch 16 for recording three simultaneous esophageal leads or any combination of an esophageal lead, a chest or precordial lead, and an intra-cardiac lead. Switch 14 comprises an esophageal electrode selector having three separate sections 14A, 14B, and 14C. As here shown, each of said sections is provided with fifteen fixed esophageal terminal contacts designated as EC1 through EC15, respectively. The fixed contacts of each of said sections are connected in parallel to fifteen esophageal leads designated as E1 through E15, respectively. Said esophageal leads are contained in the esophageal tube 18 which is inserted into the esophagus of the subject in a manner fully described by W. H. Brown in "A study of the oesophageal lead in clinical electrocardiography," published in the American Heart Journal, vol. 12, page 1, 1936. It will be understood that each esophageal lead terminates in an esophageal electrode, not illustrated, which is positioned in the esophagus in predetermined position relative to the subject's heart, for indicating, at each of said positions, voltages representative of the condition of the heart. The movable contacts of said switch sections 14A, 14B and 14C, are indicated at 20A, 20B and 20C, respectively. Said movable contacts are connected by lines 22A, 22B and 22C, respectively, to the stationary contacts E of sections 16A, 16B and 16C, respectively, of lead selector switch 16. In order to attenuate or suppress comparatively large and very low frequency incidental body voltages, such as, for example, breathing and gastric voltages, which are picked up by the esophageal electrode and transmitted by the esophageal lead, for preventing them from reaching the contacts E for introduction into the electrocardiograph channels, a filter 24 is provided in each of the lines 22A, 22B and 22C, respectively. Said filter comprises a capacitor 26 inserted in the line and a resistor 28. One end of said resistor is connected to the line between the capacitor and contact E, and the other end is connected to ground.

Provision is also made for recording the unipolar chest voltages. In this connection it will be understood that the precordial terminals P1, P2 and P3 are adapted to be connected through suitable lines to precordial electrodes positionable on the subject's body. Said precordial terminals are connected by the lines 30A, 30B and 30C, respectively, to the stationary contacts P of selector switch sections 16A, 16B and 16C, respectively.

In addition, provision is made for recording intra-cardiac voltages. In this connection, it will be understood that the intra-cardiac terminals Ic1, Ic2, and Ic3 are adapted for connection through suitable lines to catheters provided with heart electrodes which are inserted through a vein of the subject's body for positioning said heart electrodes in predetermined heart portions. This technique is a known practice in cardiology and is described both by A. Battro and H. Bidoggia in "Endocardiac electrogram obtained by heart catheterization in man," published in the American Heart Journal, vol. 33, page 604, 1947, and by H. D. Levine, H. K. Hellems, M. H. Wittenborg, and L. Dexter in "Studies in intracardiac electrography in man," published in the American Heart Journal, vol. 37, page 64, 1949. Said terminals are connected by lines 32A, 32B and 32C, respectively, to the stationary contacts IC of selector switch sections 16A, 16B and 16C, respectively. Each of said switch sections is also provided with an "off" position at the stationary contact O which is grounded through the resistor 34, preferably 1000 ohms.

The selector switch sections are provided with the movable contacts 36A, 36B and 36C, respectively, which are connected to input terminals 40A, 40B and 40C, respectively, of channels A, B and C, respectively. The companion channel input terminals 38A, 38B and 38C, respectively, are each connected to the central terminal CT of the indifferent electrode of zero potential which may be the Wilson or Goldberger terminal, both fully described at pages 50 and 51 of "Unipolar lead electrography" by E. Goldberger, published by Lea & Febiger, 1949. As here shown, said electrode comprises a Wilson terminal and is constituted by the terminals LA, RA and LL each of which is connected to terminal CT through a resistor 42 which is preferably 5000 ohms. It will be understood that the terminals LA, RA and LL are adapted to be connected to the patient electrodes designated in cardiology as the LA, RA and LL electrodes which are secured to the extremities.

In operating the apparatus 10, if it is desired, that an esophageal voltage be recorded on recorder 12 at the output of channel A, for example, movable contact 36A is moved to position E of selector switch section 16A and movable contact 20A of esophageal switch section 14A is moved to the desired one of the fifteen positions thereof. In the same manner, voltages transmitted by the esophageal lead may be recorded at either or both of the outputs of channels B and C, respectively, by properly positioning movable contacts 36B and 36C whereby to effect the simultaneous recording of one or more of said voltages. As previously indicated, the voltages transmitted by the various esophageal leads E1 through E15, inclusive, comprise voltages representative of the condition of the subject's heart, which voltages should be recorded, as well as incidental body voltages of lower frequency and comparatively of large amplitude, which are undesirable for recording. These undesired body voltages, such as, for example, breathing and gastric voltages, tend to obscure the recording of the desired voltages representative of the subject's heart condition and make it difficult to obtain consistent readings of said desired voltages. The undesired incidental lower frequency body voltages which may be transmitted from the esophageal electrodes through the esophageal switch are attenuated before reaching the input terminals of the respective channels due to the action of filter units 24 and therefore do not obscure the recording of voltages representative of the heart condition. In apparatus constructed and operated pursuant to the present invention, the filter units were each constituted by a .5 microfarad capacitor and a 220,000 ohm resistor. It was found that the time constant of 110,000 microseconds of such resistance-capacitance filters was such as to provide a low frequency response for the electrocardiograph 10, as is illustrated by the curve 44 of Fig. 2. It will be noted, as indicated by that portion of said curve between points 46 and 48, that voltages having frequencies of four cycles per second, or higher, were passed with substantially no attenuation by filters 24. Voltages of these frequencies, starting substantially at four cycles per second, represent the body voltages desired to be recorded since they represent to the cardiologist the condition of the heart. Voltages having frequencies of less than four cycles per second, representing the incidental body voltages which are undesired for recording, are substantially suppressed or attenuated, as indicated by that portion of said curve between points 46 and 50, so that they do not obscure the recording of the representative heart voltages. The attenuation of said lower frequency voltages serves to stabilize the recording of the representative body voltages to produce consistent readings of said representative voltages.

By positioning the movable contacts of selector switch sections 16A, 16B and 16C, voltages transmitted by various combinations of leads can be recorded simultaneously. For example, while voltages transmitted by an esophageal lead are being recorded through one channel, precordial voltages can be recorded through the second channel, and intracardiac voltages can be recorded through the third channel. As illustrated in Fig. 1, movable contact 36A is engaged with stationary contact Ic of switch section 16A to transmit an intra-cardiac voltage through channel A to the recorder, movable contact 36B is engaged with stationary contact P of switch section 16B to transmit a precordial voltage through channel B to the recorder, and channel C is transmitting to the recorder a voltage from the esophageal lead E9 through stationary contact EC9 and movable contact 20C of switch section 14C and from the latter through stationary contact E and movable contact 36C of switch section 16C. It will also be evident that various other combinations of transmitted voltages can be recorded, as desired. It will be apparent that, if desired, voltages may be recorded through only one or two of the channels, by positioning one or two of the movable contacts of selector switch 16 in the "off" positions thereof at contact O.

As illustrated, the present invention is embodied in a multiple-lead electrocardiograph but it will be readily understood that it is within the scope of my invention to apply the underlying idea to a uni-lead electrocardiograph for preventing the transmission of breathing and gastric voltages to the electrocardiograph. Also the invention is not limited to a direct-writing electrocardiograph.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In an electrocardiograph, a channel for amplifying voltages transmitted thereto from the subject's body, electrical terminal means in circuit with the input to said channel for connection to an esophageal lead positionable in the subject's esophagus for investigating a condition of the subject's heart as indicated by voltages representative of such condition, and filter means interposed in the circuit between said electrical terminal means and the input to said channel for substantially attenuating incidental body voltages of lower frequency than said representative voltages to prevent the transmission of said incidental lower frequency body voltages through the esophageal lead to said channel.

2. In an electrocardiograph, a channel for amplifying voltages transmitted thereto from the subject's body, a terminal connector in circuit with the input to said channel for connection to an esophageal lead positionable in the subject's esophagus for investigating a condition of the subject's heart as indicated by voltages representative of such condition, and filter means interposed in the circuit between said terminal connector and the input to said channel for substantially suppressing incidental body voltages of lower frequency than said representative voltages to prevent the transmission of said incidental lower frequency body voltages through the esophageal lead to said channel, said filter means having a time constant which permits the transmission therethrough of said representative voltages substantially without attenuation thereof.

3. In an electrocardiograph, a channel for amplifying voltages transmitted thereto from the subject's body, terminal connector means in circuit with the input to said channel for connection to an esophageal lead positionable in the subject's esophagus for investigating a condition of the subject's heart as indicated by voltages representative of such condition, and filter means interposed in the circuit between said first mentioned means and the input to said channel for substantially attenuating incidental body voltages of lower frequency than said representative voltages to prevent the transmission of said incidental lower frequency body voltages through the esophageal lead to said channel, said filter means comprising a resistance-capacitance network having a time constant effective to substantially attenuate said incidental lower frequency body voltages and to pass said representative voltages therethrough substantially without attenuation.

4. In an electrocardiograph, a channel for amplifying voltages transmitted thereto from the subject's body, a terminal contact in circuit with the input to said channel for connection to an esophageal lead positionable in the subject's esophagus for investigating a condition of the subject's heart as indicated by voltages representative of such condition, and filter means interposed in the circuit between said terminal contact and the input to said channel for substantially attenuating incidental body voltages of lower frequency than said representative voltages to prevent the transmission of said incidental lower frequency body voltages through the esophageal lead to said channel, said filter means having a time constant which substantially attenuates voltages having frequencies less than substantially four cycles per second.

5. In an electrocardiograph, a channel for amplifying voltages transmitted thereto from the subject's body, a terminal contact in circuit with the input to said channel for connection to an esophageal lead positionable in the subject's esophagus for investigating a condition of the subject's heart as indicated by voltages representative of such condition, and filter means interposed in the circuit between said terminal contact and the input to said channel for substantially attenuating incidental body voltages of lower frequency than said representative voltages to prevent the transmission of said incidental lower frequency body voltages through the esophageal lead to said channel, said filter means having a time constant of substantially 110,000 microseconds which is effective to substantially attenuate voltages having frequencies less than substantially four cycles per second whereby said incidental low frequency body voltages are substantially attenuated and said representative voltages are passed therethrough substantially without attenuation.

6. For use in an electrocardiograph having a channel for amplifying voltages transmitted thereto from the subject's body, an esophageal switch adapted for connection to a plurality of esophageal leads positionable in the subject's esophagus for investigating a condition of the subject's heart as indicated by voltages representative of such condition, said switch being connected to the input of said channel and being operable to connect a selected one of said leads to said channel, and filter means connected between said switch and said channel for substantially attenuating incidental body voltages of lower frequency than said representative voltages to prevent the transmission of said incidental lower frequency voltages to said channel.

7. For use in an electrocardiograph having a channel for amplifying voltages transmitted thereto from the subject's body, means adapted for connection to an esophageal lead positionable in the subject's esophagus for investigating a condition of the subject's heart as indicated by voltages representative of such condition, means adapted for connection to a source of body voltage other than the esophagus for indicating voltages representative of such condition at said source, switch means connected to the input of said channel for selectively connecting said channel to one of said means, and filter means connected between said first mentioned means and said switch means for substantially attenuating incidental body voltages of lower frequency than said first mentioned representative voltages to prevent the transmission of said incidental lower frequency body voltages through the esophageal lead to said channel.

8. For use in an electrocardiograph having a channel for amplifying voltages transmitted thereto from the subject's body, an esophageal switch adapted for connection to a plurality of esophageal leads positionable in the subject's esophagus for investigating a condition of the subject's heart as indicated by voltages representative of such condition, a selector switch connected between said esophageal switch and the input to said channel, said selector switch being adapted for connection to a source of body voltage other than the esophagus and being operable to selectively connect said channel to the output of said esophageal switch and to said other source, said esophageal switch being operable to connect a selected one of said esophageal leads to said selector switch, and filter means connected between said switches for substantially attenuating incidental body voltages of lower frequency than said representative voltages to prevent the transmission of said incidental lower frequency body voltages through the selected esophageal lead to said channel.

9. For use in a multiple-lead electrocardiograph having a plurality of channels for amplifying voltages transmitted thereto from the subject's body, a similar plurality of esophageal terminals each adapted for connection to an esophageal lead positionable in the subject's esophagus for investigating a condition of the subject's heart as indicated by voltages representative of such condition, a similar plurality of precordial terminals each adapted for connection to a precordial lead from the subject's body, a similar plurality of intra-cardiac terminals each adapted for connection to an intra-cardiac lead from the subject's body, and a similar plurality of selector switches each connected to the input of one of said channels, respectively, each of said switches being operable to selectively connect an esophageal lead, a precordial lead and an intra-cardiac lead to its associated channel, and filter means connected between each of said switches and its associated esophageal terminal for substantially attenuating incidental body voltages of lower frequency than said representative voltages to prevent the transmission of said incidental lower frequency body voltages through the associated esophageal lead to the associated channel.

10. For use in a multiple-lead electrocardiograph having a plurality of channels for amplifying voltages transmitted thereto from the subject's body, a similar plurality of esophageal switches each adapted for connection to a plurality of esophageal leads positionable in the subject's esophagus for investigating a condition of the subject's heart as indicated by voltages representative of such condition, a similar plurality of precordial terminals each adapted for connection to a precordial lead from the subject's body, a similar plurality of intra-cardiac terminals each adapted for connection to an intra-cardiac lead from the subject's body, and a similar plurality of selector switches each connected to the input of one of said channels, respectively, each of said selector switches being operable to selectively connect one of said esophageal switches, a precordial lead and an intra-cardiac lead to its associated channel, said esophageal switches each being operable to connect a selected one of said esophageal leads to its associated selector switch, and filter means connected between each esophageal switch and its associated selector switch for substantially attenuating incidental body voltages of lower frequency than said representative voltages to prevent the transmission of said incidental lower frequency body voltages through the selected esophageal lead to the associated channel.

MILTON H. PELAVIN.

References Cited in the file of this patent

UNITED STATES PATENTS

| Number | Name | Date |
|---|---|---|
| 2,124,203 | Pauliy | July 19, 1938 |
| 2,193,471 | Both | Mar. 12, 1940 |
| 2,194,555 | Keall | Mar. 26, 1940 |